US012800936B2

(12) United States Patent
Liu et al.

(10) Patent No.: US 12,800,936 B2
(45) Date of Patent: Nov. 17, 2026

(54) HEAD-MOUNTED DISPLAY DEVICE

(71) Applicant: HTC Corporation, Taoyuan City (TW)

(72) Inventors: Wan-Hsieh Liu, Taoyuan City (TW); Li-Hsun Chang, Taoyuan City (TW); Qing-Long Deng, Taoyuan City (TW)

(73) Assignee: HTC Corporation, Taoyuan City (TW)

(*) Notice: Subject to any disclaimer, the term of this patent is extended or adjusted under 35 U.S.C. 154(b) by 161 days.

(21) Appl. No.: 18/954,555

(22) Filed: Nov. 21, 2024

(65) Prior Publication Data

US 2025/0224609 A1 Jul. 10, 2025

Related U.S. Application Data

(60) Provisional application No. 63/618,398, filed on Jan. 8, 2024.

(51) Int. Cl.
*G02B 27/01* (2006.01)
*G02C 3/00* (2006.01)

(52) U.S. Cl.
CPC ......... *G02B 27/0172* (2013.01); *G02C 3/003* (2013.01); *G02B 2027/0178* (2013.01)

(58) Field of Classification Search
CPC ........ G02B 27/0172; G02B 2027/0178; G02B 27/0176; G02C 3/003; G02C 7/088
See application file for complete search history.

(56) References Cited

U.S. PATENT DOCUMENTS

| | | | | |
|---|---|---|---|---|
| 9,753,303 | B2 | 9/2017 | Billetz et al. | |
| 10,261,324 | B2 | 4/2019 | Chuang et al. | |
| 2020/0096775 | A1* | 3/2020 | Franklin | G02B 27/0176 |

FOREIGN PATENT DOCUMENTS

| | | |
|---|---|---|
| CN | 112925099 | 6/2021 |
| CN | 113692548 | 11/2021 |
| TW | M286935 | 2/2006 |
| TW | M447995 | 3/2013 |

OTHER PUBLICATIONS

"Office Action of Taiwan Counterpart Application", issued on Jul. 10, 2025, p. 1-p. 7.

* cited by examiner

*Primary Examiner* — James C. Jones
(74) *Attorney, Agent, or Firm* — JCIPRNET

(57) ABSTRACT

A head-mounted display device includes a body, a first optical lens group, and a second optical lens group. The body has a first and second lens holders respectively used to accommodate a first and second lenses corresponding to both eyes. An inner wall of the first lens holder has two first combining portions. An inner wall of the second lens holder has two second combining portions. The first and second optical lens groups are installed in the body and respectively correspond to the first lens holder and the second lens holder. When the first lens is accommodated in the first lens holder, two third combining portions of the first lens are combined with the first combining portions, and a gap is maintained between the first lens and the first optical lens group. When the second lens is accommodated in the second lens holder, two fourth combining portions of the second lens are combined with the second combining portions, and a gap is maintained between the second lens and the second optical lens group.

7 Claims, 7 Drawing Sheets

HEAD-MOUNTED DISPLAY DEVICE

CROSS-REFERENCE TO RELATED APPLICATION

This application claims the priority benefit of U.S. provisional application Ser. No. 63/618,398, filed on Jan. 8, 2024. The entirety of the above-mentioned patent application is hereby incorporated by reference herein and made a part of this specification.

BACKGROUND

Technical Field

The disclosure relates to a head-mounted display device, and in particular to a head-mounted display device that can allow a user to prepare a correction lens for use.

Description of Related Art

With the rapid advancement of current technology, types and functions of head-mounted display devices are becoming increasingly diversified. Taking the augmented reality head-mounted display device as an example, if the user has a common vision problem such as myopia, hyperopia, or astigmatism and wants to wear the augmented reality head-mounted display device, a pair of vision correction lenses needs to be prepared and placed on a lens frame, and the lens frame is then assembled to the device to be located between the device and the eyes of the user. When different users use the same augmented reality head-mounted display device, vision correction lenses and lens frames thereof that suit them must also be changed, and assembly problems between the lens frames and the device also affect the effectiveness of vision correction.

SUMMARY

The disclosure provides a head-mounted display device that can improve the problem of inconvenience when combining vision correction lenses prepared by a user.

A head-mounted display device of the disclosure includes a body, a first optical lens group, and a second optical lens group. The body has a first lens holder and a second lens holder respectively used to accommodate a first lens and a second lens corresponding to both eyes. An inner wall of the first lens holder has at least two first combining portions. An inner wall of the second lens holder has at least two second combining portions. The first optical lens group and the second optical lens group are installed in the body and respectively correspond to the first lens holder and the second lens holder. When the first lens is accommodated in the first lens holder, two third combining portions of the first lens are combined with the first combining portions, and a gap is maintained between the first lens and the first optical lens group. When the second lens is accommodated in the second lens holder, two fourth combining portions of the second lens are combined with the second combining portions, and a gap is maintained between the second lens and the second optical lens group.

Based on the above, in the head-mounted display device of the disclosure, the lens holders are combined with the body. Therefore, there are no assembly and alignment problems between the lens holders and the body, and the lenses may be fixed at appropriate positions through the design of the combining portions.

DESCRIPTION OF THE EMBODIMENTS

Figure 1:
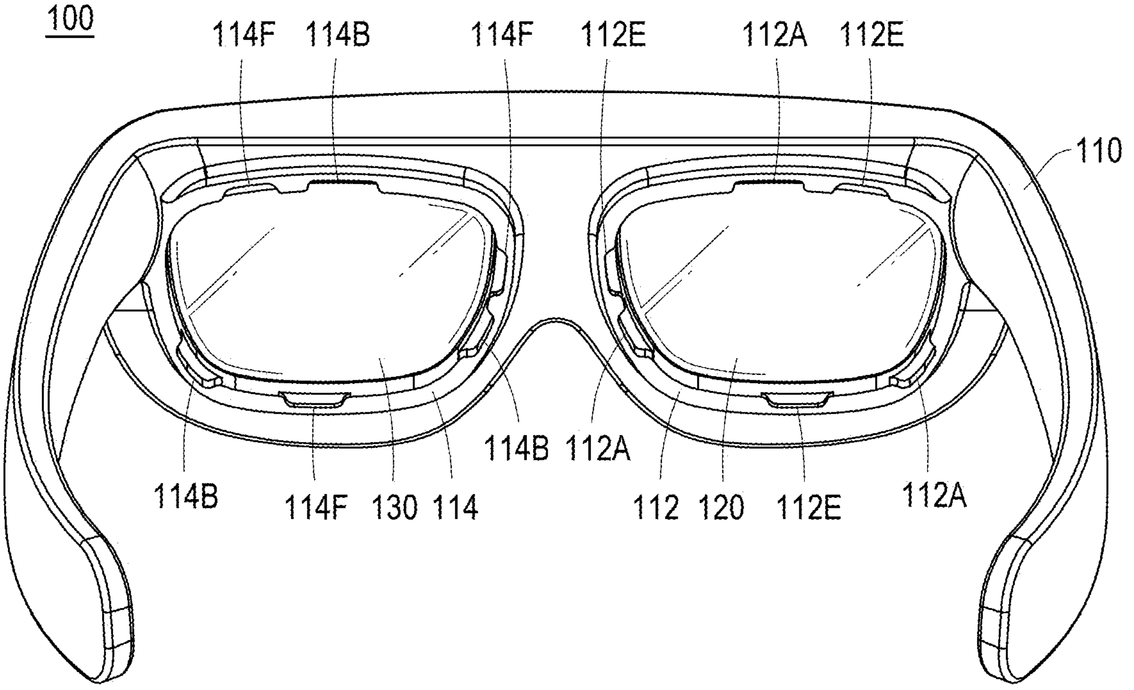
FIG. 1 is a schematic diagram of a head-mounted display device according to an embodiment of the invention.
Figure 2:
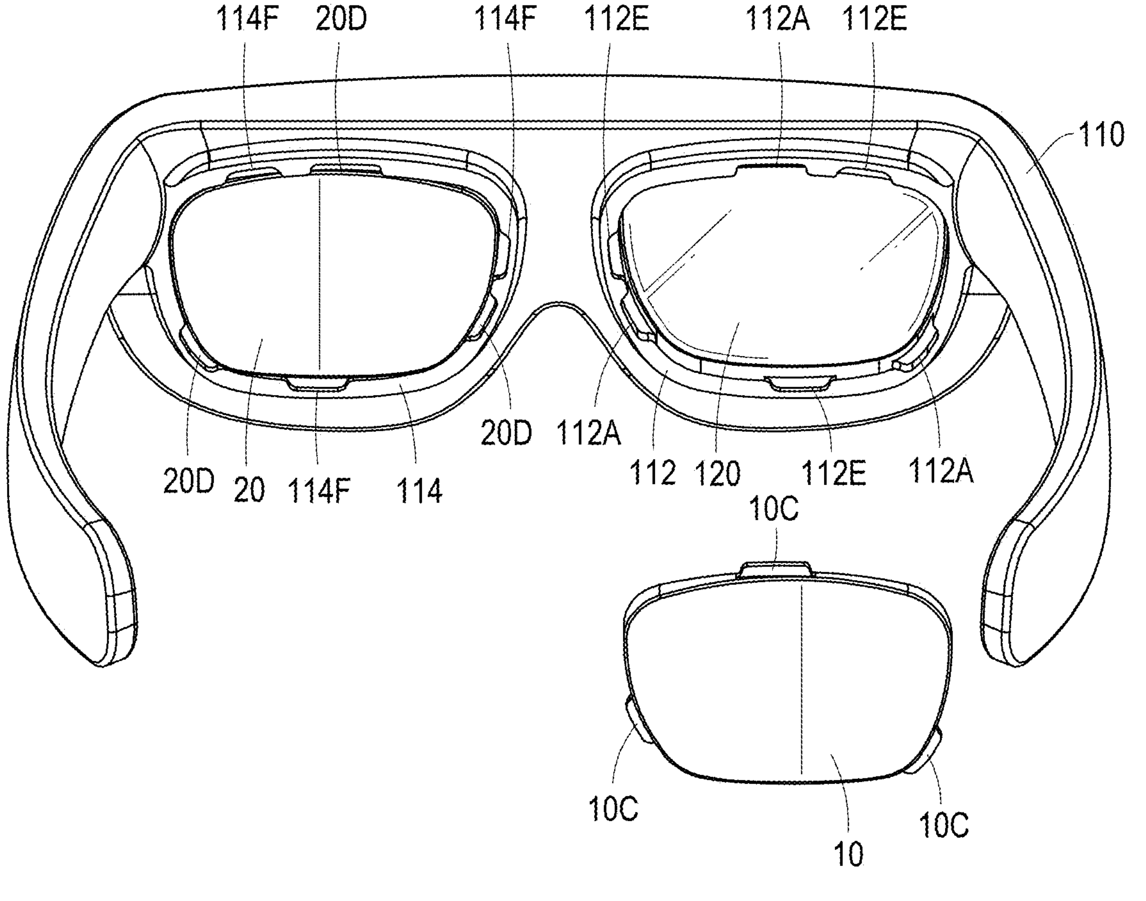
FIG. 2 is a schematic diagram of the head-mounted display device of FIG. 1 when a lens is installed.

FIG. 1 is a schematic diagram of a head-mounted display device according to an embodiment of the invention. FIG. 2 is a schematic diagram of the head-mounted display device of FIG. 1 when a lens is installed. Please refer to FIG. 1 and FIG. 2. A head-mounted display device 100 of the embodiment includes a body 110, a first optical lens group 120, and a second optical lens group 130. The body 110 has a first lens holder 112 and a second lens holder 114 respectively used to accommodate a first lens 10 and a second lens 20 corresponding to both eyes.

In the embodiment, the host 110 may be applied to fields such as a virtual reality system, an augmented reality system, or a mixed reality system. The host 110 may include components such as an optical system and a protective housing, and may be provided with a display or be suitable for placing a display. The display may be a built-in display or an external portable display (for example, a smart phone, etc.), but the disclosure is not limited thereto. The optical system includes an optical element for changing a light path of the display, such as a lens element, a light guide member, or a prism. The host 110 of FIG. 1 is shown in the form with a slightly larger size, but the host 110 may also be in the form of thinner glasses or other forms with even larger sizes.

An inner wall of the first lens holder 112 has at least two first combining portions 112A. An inner wall of the second lens holder 114 has at least two second combining portions 114B. In the embodiment, the number of the first combining portions 112A and the second combining portions 114B is both exemplified as three, but there may also be only two or more. The first optical lens group 120 and the second optical lens group 130 are installed in the body 110. The first optical lens group 120 corresponds to the first lens holder 112, and the second optical lens group 130 corresponds to the second lens holder 114.

When the first lens 10 is accommodated in the first lens holder 112, two third combining portions 10C of the first lens 10 are combined with the first combining portions 112A, and a gap is maintained between the first lens 10 and the first optical lens group 120. When the second lens 20 is accommodated in the second lens holder 114, two fourth combining portions 20D of the second lens 20 are combined with the second combining portions 114B, and a gap D0 is maintained between the second lens 20 and the second optical lens group 130 without contacting each other. In this way, friction and damage caused by contact between the first lens 10 and the first optical lens group 120 and the second lens 20 and the second optical lens group 130 may be prevented, and light leakage and light energy loss caused by contact between the two may also be prevented. On the other hand, if the gap D0 is too large without limitation, considering the possibility of using thicker correction lenses, the distance between the first optical lens group 120 and the second optical lens group 130 and the human eyes will be further increased, causing narrowing of the field of view, and the human eyes may easily see the edges of the first optical lens group 120 and the second optical lens group 130, which reduces pleasantness of user experience. In the embodiment, the number of the third combining portions 10C and the fourth combining portions 20D is both exemplified as three, but there may also be only two or more.

In the head-mounted display device 100 of the embodiment, the first lens holder 112 and the second lens holder 114 are originally disposed on the body 110, so the user does not need to assemble the first lens holder 112 and the second lens holder 114 to the body 110, and no alignment is required. The combination of the third combining portion 10C and the first combining portion 112A enables the assembly and positioning between the first lens 10 and the first lens holder 112 to be easily completed. The combination of the fourth combining portion 20D and the second combining portion 114B enables the assembly and positioning between the second lens 20 and the second lens holder 114 to be easily completed.

The first lens 10 and the second lens 20 are not a part of the head-mounted display device 100 of the embodiment. That is, when the user obtains the head-mounted display device 100 of the embodiment, the first lens 10 and the second lens 20 are not included. Since the head-mounted display device 100 is designed for use by all users, the head-mounted display device 100 does not have functions that may adapt to vision correction requirements of individual users. If the user has a vision problem such as myopia, hyperopia, or astigmatism, the user may prepare the first lens 10 and the second lens 20 with corresponding vision correction functions to be installed on the first lens holder 112 and the second lens holder 114, so as to obtain a better visual experience. When the head-mounted display device 100 is used by other users, since different users require different vision correction effects, the new user may prepare a third lens 12 and a fourth lens 22 with a vision correction function suitable for the new user to be installed on the first lens holder 112 and the second lens holder 114, so as to also obtain a better visual experience.

Figure 3:
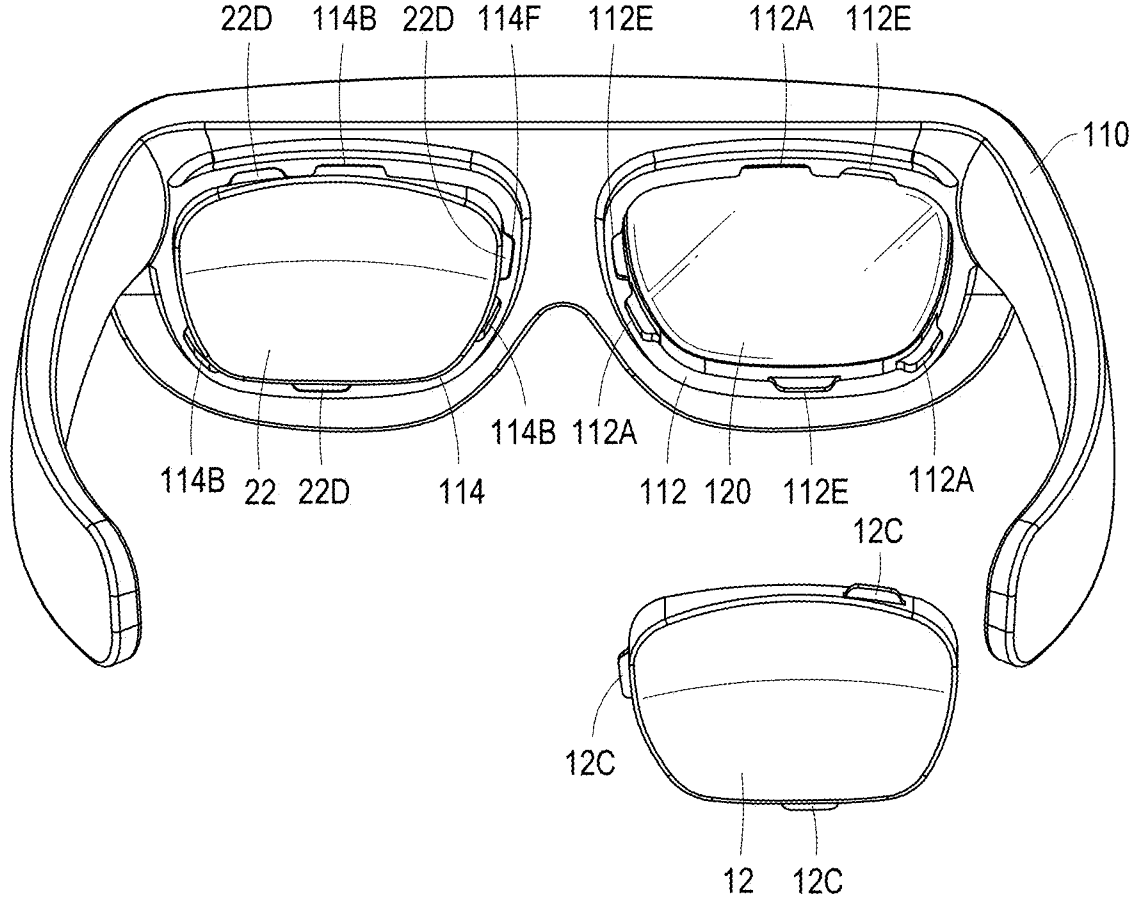
FIG. 3 is a schematic diagram of the head-mounted display device of FIG. 1 when another lens is installed.

FIG. 3 is a schematic diagram of the head-mounted display device of FIG. 1 when another lens is installed. Please refer to FIG. 1 and FIG. 3. In the embodiment, the inner wall of the first lens holder 112 further has at least two fifth combining portions 112E. The inner wall of the second lens holder 114 further has at least two sixth combining portions 114F. In the embodiment, the number of the fifth combining portions 112E and the sixth combining portions 114F is both exemplified as three, but there may also be only two or more. When the third lens 12 is accommodated in the first lens holder 112, two seventh combining portions 12C of the third lens 12 are combined with the fifth combining portions 112E, and a gap is maintained between the third lens 12 and the first optical lens group 120. When the fourth lens 22 is accommodated in the second lens holder 114, two eighth combining portions 22D of the fourth lens 22 are combined with the sixth combining portions 114F, and a gap is maintained between the fourth lens 22 and the second optical lens group 130. In this way, friction and damage caused by contact between the third lens 12 and the first optical lens group 120 and the fourth lens 22 and the second optical lens group 130 may be prevented, and light leakage and light energy loss caused by contact between the two may also be prevented. In the embodiment, the number of the seventh combining portions 12C and the eighth combining portions 22D is both exemplified as three, but there may also be only two or more.

Here, optical properties of the third lens 12 are different from optical properties of the first lens 10. Optical properties of the fourth lens 22 are different from optical properties of the second lens 20. That is, the first lens 10 and the second lens 20 may be suitable for one user, and the third lens 12 and the fourth lens 22 may be suitable for another user. When the optical properties of the lens are different, geometric dimensions such as concavity/convexity and thicknesses of the lenses are also different. Therefore, the first lens holder 112 and the second lens holder 114 provide different combining portions to combine different lenses, which may prevent assembly errors by users to greatly improve the convenience of use.

Figure 4:
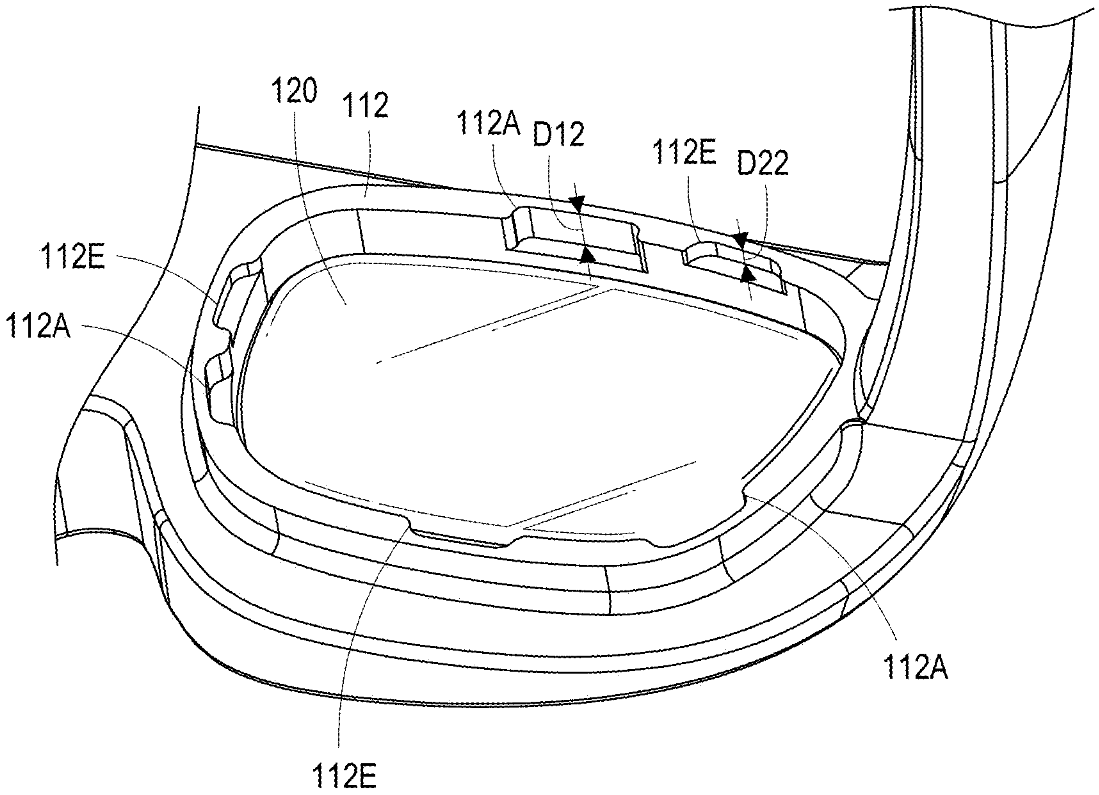
FIG. 4 is a partial enlarged schematic diagram of the head-mounted display device of FIG. 1.

FIG. 4 is a partial enlarged schematic diagram of the head-mounted display device of FIG. 1. Please refer to FIG. 2 to FIG. 4. In the embodiment, the first combining portion 112A, the second combining portion 114B, the fifth combining portion 112E, and the sixth combining portion 114F are recessed notches. A recession depth D12 of the first combining portion 112A is different from a recession depth D22 of the fifth combining portion 112E. A recession depth of the second combining portion 114B is different from a recession depth of the sixth combining portion 114F. Since the optical properties of the third lens 12 are different from the optical properties of the first lens 10, the geometric dimensions such as concavity/convexity and thickness of the third lens 12 are also different from the geometric dimensions such as concavity/convexity and thickness of the first lens 10. After pre-designing the recession depth D12 of the first combining portion 112A and the recession depth D22 of the fifth combining portion 112E, when the first lens 10 and the third lens 12 are installed on the first lens holder 112, a good vision correction result may be obtained, and the user does not need to adjust the gap between the lens and the optical lens group. Similarly, since the optical properties of the fourth lens 22 are different from the optical properties of the second lens 20, the geometric dimensions such as concavity/convexity and thickness of the fourth lens 22 are also different from the geometric dimensions such as concavity/convexity and thickness of the second lens 20. After pre-designing the recession depth of the second combining portion 114B and the recession depth of the sixth combining portion 114F, when the second lens 20 and the fourth lens 22 are installed on the second lens holder 114, a good vision correction result may be obtained, and the user does not need to adjust the gap between the lens and the optical lens group.

Figure 5:
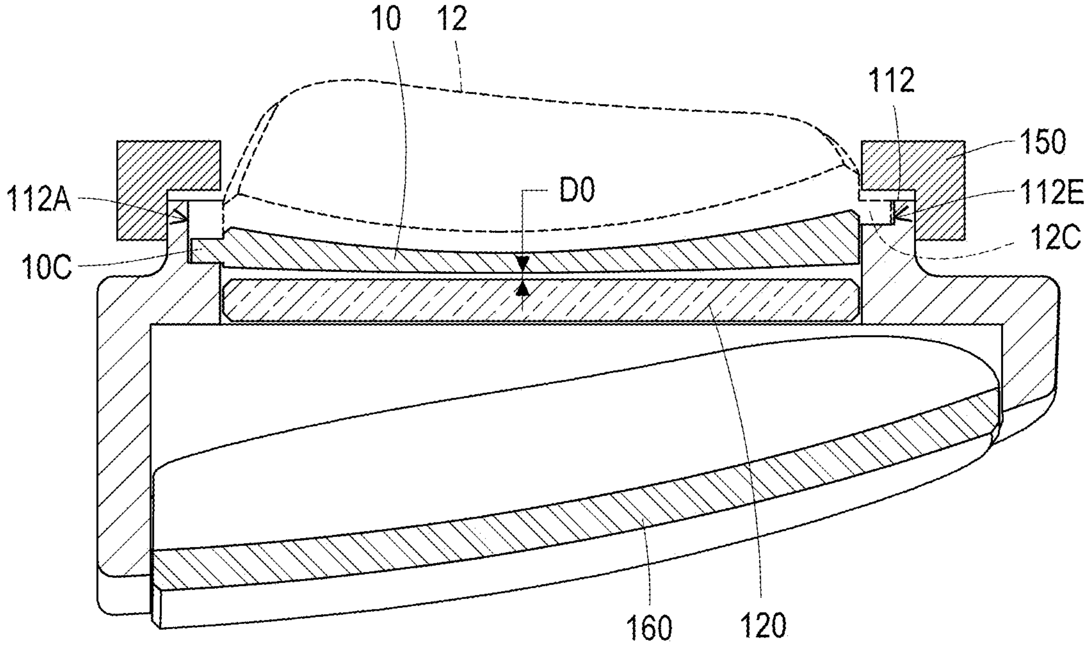
FIG. 5 is a partial cross-sectional schematic diagram of the head-mounted display device of FIG. 1 after a fastener is installed.

FIG. 5 is a partial cross-sectional schematic diagram of the head-mounted display device of FIG. 1 after a fastener is installed. Please refer to FIG. 1 and FIG. 5. In the embodiment, the first lens holder 112, the second lens holder 114, and the body 110 are integrally formed, but the disclosure is not limited thereto. In addition, the head-mounted display device 100 of the embodiment may further include a fastener 150 for fixing the first lens 10 to the first lens holder 112. Of course, the head-mounted display device 100 may further include another fastener (not shown) for fixing the second lens 20 to the second lens holder 114. Alternatively, appropriate combining force may be provided between the combining portions of the lens and the lens holder, so that the lens may be firmly fixed in the lens holder. The head-mounted display device 100 of the embodiment may further include a protective lens 160 installed on the outside of the body 110 to protect various elements installed in the body 110.

In addition, the third lens 12 that may also be fixed to the first lens holder 112 is also shown of FIG. 5. As mentioned above, the geometric dimensions such as concavity/convexity and thickness of the third lens 12 are different from the geometric dimensions such as concavity/convexity and thickness of the first lens 10. The refractive index of a correction lens is commonly 1.5, 1.56, 1.6, 1.67, 1.7, 1.74, etc., but the disclosure is not limited thereto. Under the same correction power, using a lens with a higher refractive index produces a correction lens with smaller curvature and thinner thickness. That is, the thickness of the correction lens changes depending on the correction diopter, the arc surface forms of the front and rear arc surfaces, the diameter, and the refractive index. For example, a lens for correcting myopia has a power of 400 degrees, the refractive index of the material used is 1.6, the front arc surface and the rear arc surface are aspherical, and the maximum edge thickness is 6 mm at a diameter of 75 mm. At this time, if the material with a refractive index of 1.67 is used, the maximum edge thickness will be 5.1 mm. If the material with a refractive index of 1.74 is used, the maximum edge thickness will be reduced to 4.4 mm. Therefore, lenses with different thicknesses are matched with corresponding combining portions on the lens holder, so that the gap D0 may be maintained between the lens and the optical lens group without contacting each other.

In more detail, after pre-designing the recession depth D12 of the first combining portion 112A and the recession depth D22 of the fifth combining portion 112E, when the first lens 10 or the third lens 12 is installed on the first lens holder 112, the gap D0 between the first lens 10 and the first optical lens group 120 or the gap D0 between the third lens 12 and the first optical lens group 120 may be the same or similar, so as to provide a similar visual experience, such as similar optical properties or similar fields of view. As for the second lens 20 or the fourth lens 22 installed on the second lens holder 114, the same or similar gap D0 may also be maintained, which will not be repeated here.

Figure 6:
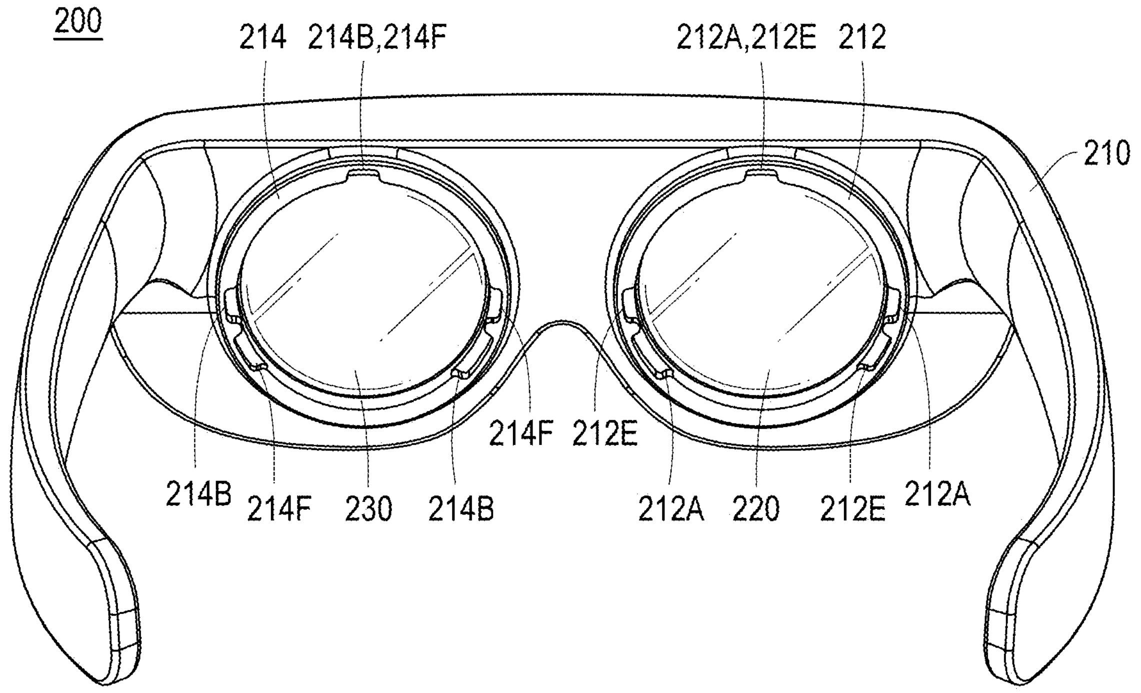
FIG. 6 is a schematic diagram of a head-mounted display device according to another embodiment of the invention.
Figure 7:
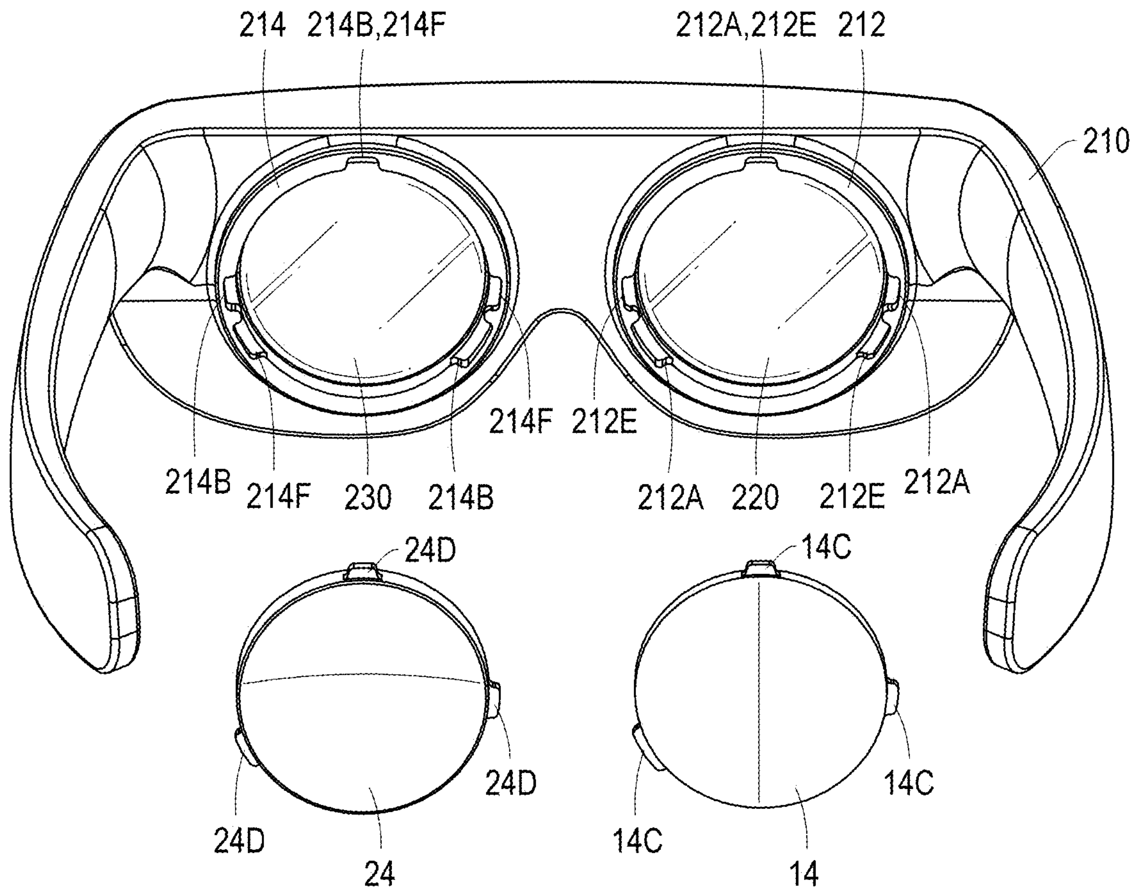
FIG. 7 is a schematic diagram of the head-mounted display device of FIG. 6 when matched with two lenses.

FIG. 6 is a schematic diagram of a head-mounted display device according to another embodiment of the invention. FIG. 7 is a schematic diagram of the head-mounted display device of FIG. 6 when matched with two lenses. Please refer to FIG. 6 and FIG. 7. A head-mounted display device 200 of the embodiment is similar to the head-mounted display device 100 of FIG. 1, and only the difference between the two will be described here. In the embodiment, a first lens 14 and a second lens 24 are circular. Since a circle is a symmetrical shape, improper installation may compromise the vision correction effect. For example, deviation of an astigmatism axis may lead to poor astigmatism correction effect. In order to prevent such a situation, a first combining portion 212A and a fifth combining portion 212E of a first lens holder 212 and a second combining portion 214B and a sixth combining portion 214F of a second lens holder 214 of a body 210 may be designed to be asymmetrically distributed. Furthermore, the number of the first combining portions 212A, the second combining portions 214B, the fifth combining portions 212E, and the sixth combining portions 214F may also be designed to be greater than or equal to three.

Here, the first lens 14 and the second lens 24 are exemplified as lenses that are not used by the same user. Therefore, the first lens 14 and the second lens 24 are not symmetrical. The purpose is to illustrate that the head-mounted display device 200 of the embodiment may also be used by multiple different users in turn. The third combining portion 14C of the first lens 14 is used to be combined with the first combining portion 212A of the first lens holder 212, and a fourth combining portion 24D of the second lens 24 is used to be combined with the sixth combining portion 214F of the second lens holder 214, so the number and positions of each other are in cooperation with each other.

The number of the third combining portions 14C is greater than or equal to three and the number of the fourth combining portions 24D is greater than or equal to three, which may significantly reduce the possibility of installation errors of the first lens 14 and the second lens 24 and may also ensure an ideal vision correction effect. In the embodiment, the fifth combining portion 212E and the first combining portion 212A are the same structure. That is, the same structure serves as both the fifth combining portion 212E and the first combining portion 212A. Similarly, the sixth combining portion 214F and the second combining portion 214B are the same structure. That is, the same structure serves as both the sixth combining portion 214F and the second combining portion 214B.

The first lens holder 212 may be combined with the third combining portion 14C of the first lens 14 using the first combining portion 212A, but may also be combined with another unshown lens using the fifth combining portion 212E. Similarly, the second lens holder 214 may be combined with the fourth combining portion 24D of the second lens 24 using the sixth combining portion 214F, but may also be combined with another unshown lens using the second combining portion 214B.

As mentioned in the foregoing embodiment, after pre-designing the recession depth of the first combining portion and the recession depth of the fifth combining portion, when the circular first lens or third lens is installed on the first lens holder, the gap D0 between the first lens and the first optical lens group or the gap D0 between the third lens and the first optical lens group may be the same or similar, so as to provide a similar visual experience, such as similar optical properties or similar fields of view. As for the second mirror or the fourth lens installed on the second lens holder, the same or similar gap D0 may also be maintained, which will not be repeated here.

In summary, in the head-mounted display device of the disclosure, the lens holders are combined with the body. Therefore, there are no assembly and alignment problems between the lens holders and the body, and the lenses may be fixed at appropriate positions through the design of the combining portions. Not only can the user prepare his own vision correction lenses to be combined with the head-mounted display device for use, but the lenses may also be easily assembled directly to the head-mounted display device and positioned with the optical lens group in the device, which is simple and lightweight. In addition, the lens holder has multiple pre-designed combining portions (for example, corresponding to multiple recession depths), and a single pre-designed lens may only be installed to a specific set of combining portions on the lens holder. Therefore, when different lenses are installed on the lens holder, the gaps between the lenses and the optical lens group may be maintained to be the same or similar, so as to provide a similar visual experience, such as similar optical properties or similar fields of view.

What is claimed is:

1. A head-mounted display device, comprising:

a body, having a first lens holder and a second lens holder respectively used to accommodate a first lens and a second lens corresponding to both eyes, wherein an inner wall of the first lens holder has at least two first combining portions, and an inner wall of the second lens holder has at least two second combining portions;

a first optical lens group, installed in the body and corresponding to the first lens holder; and a second optical lens group, installed in the body and corresponding to the second lens holder, wherein when the first lens is accommodated in the first lens holder, two third combining portions of the first lens are combined with the first combining portions, and a gap is maintained between the first lens and the first optical lens group, when the second lens is accommodated in the second lens holder, two fourth combining portions of the second lens are combined with the second combining portions, and a gap is maintained between the second lens and the second optical lens group, wherein the inner wall of the first lens holder further has at least two fifth combining portions, and the inner wall of the second lens holder further has at least two sixth combining portions, wherein when a third lens is accommodated in the first lens holder, two seventh combining portions of the third lens are combined with the fifth combining portions, a gap is maintained between the third lens and the first optical lens group, and optical properties of the third lens are different from optical properties of the first lens, when a fourth lens is accommodated in the second lens holder, two eighth combining portions of the fourth lens are combined with the sixth combining portions, a gap is maintained between the fourth lens and the second optical lens group, and optical properties of the fourth lens are different from optical properties of the second lens.

2. The head-mounted display device according to claim 1, wherein the first lens holder, the second lens holder, and the body are integrally formed.

3. The head-mounted display device according to claim 1, wherein a number of the first combining portions is greater than or equal to three, and a number of the second combining portions is greater than or equal to three.

4. The head-mounted display device according to claim 3, wherein a number of the third combining portions is greater than or equal to three, a number of the fourth combining portions is greater than or equal to three, the first lens and the second lens are circular, the first combining portions are asymmetrically distributed, and the second combining portions are asymmetrically distributed.

5. The head-mounted display device according to claim 1, further comprising a fastener for fixing the first lens to the first lens holder.

6. The head-mounted display device according to claim 1, wherein the first combining portions and the fifth combining portions are recessed notches, and a recession depth of the first combining portions is different from a recession depth of the fifth combining portions.

7. The head-mounted display device according to claim 1, wherein one of the fifth combining portions is one of the first combining portions, and one of the sixth combining portions is one of the second combining portions.

* * * * *